United States Patent [19]
Rachak

[11] Patent Number: 5,342,516
[45] Date of Patent: Aug. 30, 1994

[54] BIOLOGICAL WASTE CONVERSION SYSTEM

[76] Inventor: Alexander L. Rachak, 5004 E. County Rd. 66, Wellington, Colo. 80549

[21] Appl. No.: 870,673

[22] Filed: Apr. 17, 1992

[51] Int. Cl.$^5$ ............................................. C02F 3/02
[52] U.S. Cl. ................................ 210/218; 210/532.2
[58] Field of Search ............. 210/150, 151, 218, 532.2

[56] References Cited

U.S. PATENT DOCUMENTS

| | | | |
|---|---|---|---|
| 1,567,414 | 12/1925 | Bogart. | |
| 3,136,608 | 6/1964 | Lindstrom | 23/259.1 |
| 3,624,665 | 11/1971 | Klingle, Sr. | 4/10 |
| 3,776,383 | 12/1973 | Hargraves | 210/218 |
| 4,096,592 | 6/1978 | Clark | 4/111 |
| 4,196,477 | 4/1980 | Stewart | 4/111.1 |
| 4,306,968 | 12/1981 | Yost | 210/218 |
| 4,313,234 | 2/1982 | Stewart | 4/449 |

Primary Examiner—Ivars Cintins
Attorney, Agent, or Firm—Beaman & Beaman

[57] ABSTRACT

A natural aerobic biological waste conversion system for the decomposition of human waste particularly suitable for waterless on-site restrooms. A tank includes a chamber having a waste receiving bin defined therein, the bin being formed by baffles and a bulkhead so located within the chamber that air (oxygen) is directed over, under and through the decomposing material and a ventilation duct located at the bin lower region communicating with a vent assures effective oxygen exposure to the waste. The tank bottom is provided with a serpentine liquid waste flow path for extended exposure of the liquid to the circulating air for evaporation purposes, and the tank chamber includes a drying area for decomposed material prior to removal.

17 Claims, 3 Drawing Sheets

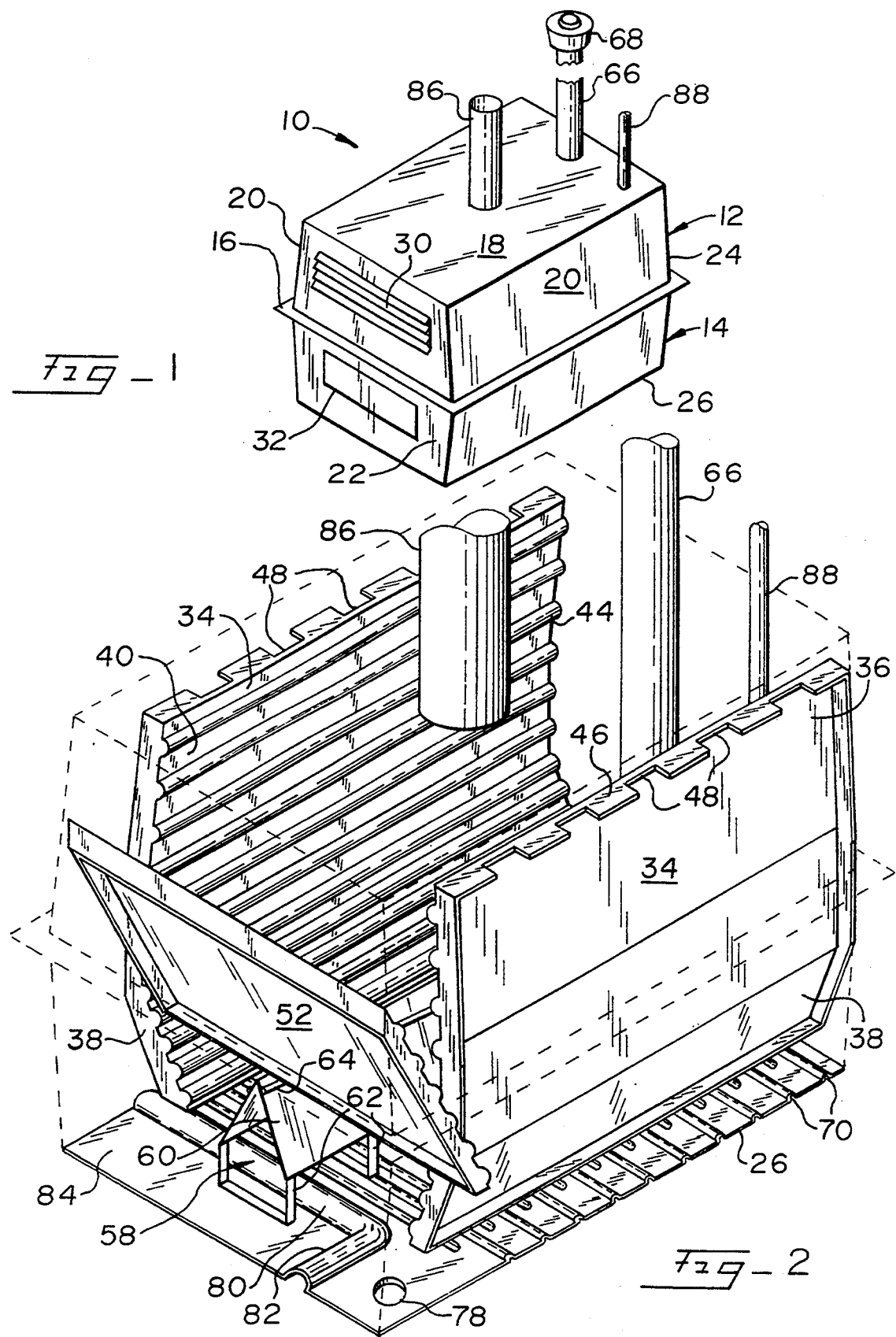

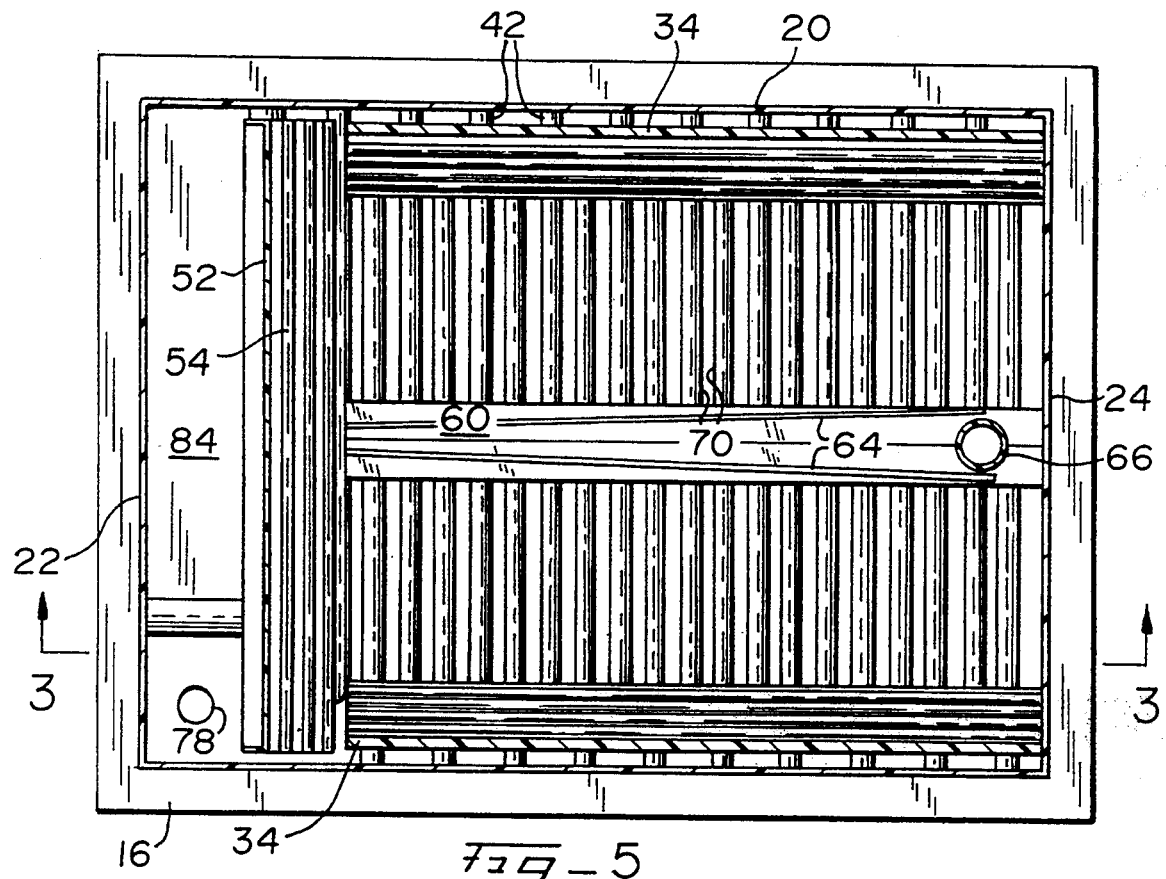
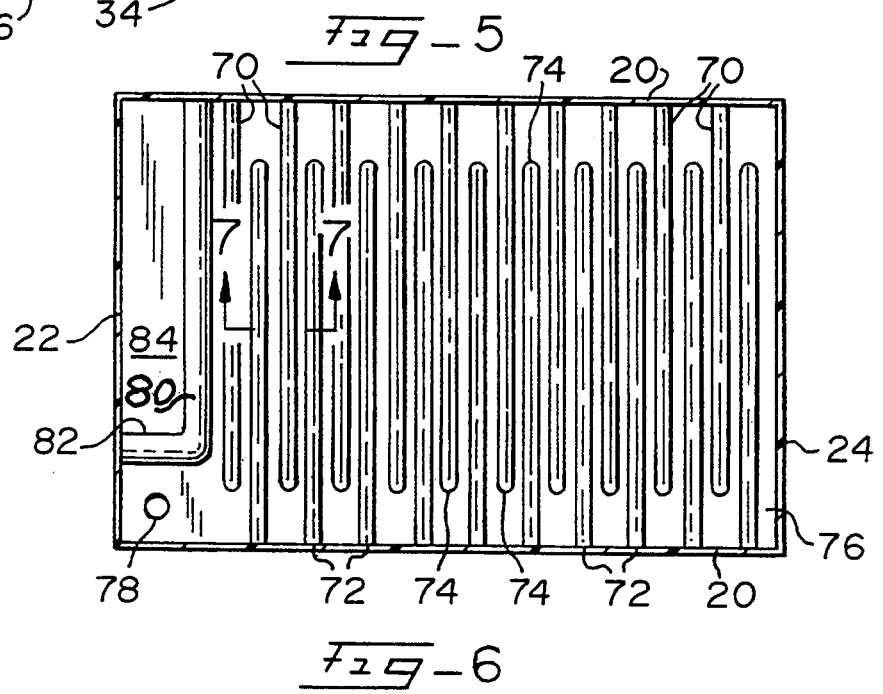
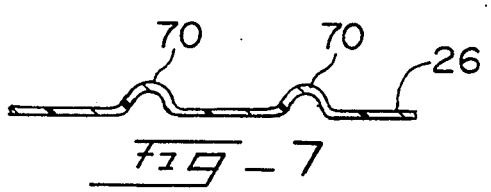

BIOLOGICAL WASTE CONVERSION SYSTEM

BACKGROUND OF THE INVENTION

1. Field of the Invention

The invention pertains to a system for producing the natural aerobic biological decomposition of human waste by controlling the distribution of air and liquid within a conversion tank where waste is subjected to aerobic bacteria, moisture and oxygen.

2. Description of the Related Art

In the installation of restrooms in parks and recreational areas, the disposal of human waste is often a serious problem. It may be necessary to locate the restroom where electric power is not available, or the terrain and subsoil may be such as to prevent the installation of septic tanks or more conventional waste disposal systems. Restrooms in mountain areas built upon rock cannot utilize a septic tank system, and the disposal of the waste by direct discharge may violate environmental regulations. "Dry" toilets and similar waste conversion systems are known, and some systems utilize chemicals and other catalysts for breaking down the waste and facilitating decomposition. However, chemical dry toilets require considerable attention and maintenance, and are not suitable for use in remote locations, such as recreational parks and hiking areas. As environmental regulations become increasingly stringent, the need for waterless on-site waste conversion systems capable of meeting environmental standards increases, and the advantages of natural aerobic biological decomposition systems using dehydration and evaporation becomes important.

It is known to devise "dry" toilets by atmospheric venting, such as shown in U.S. Pat. No. 3,136,608, and it is also known to use a plurality of evaporating tanks with a waste conversion system such as shown in U.S. Pat. No. 3,624,665. However, such disclosures have a number of drawbacks, and require considerable maintenance and attention to properly function.

Forced hot air is commonly used in dry toilets to augment evaporation and decomposition, as shown in U.S. Pat. Nos. 4,196,477 and 4,313,234, but such units require energy to heat air and are not suitable for remote installations.

SUMMARY OF THE INVENTION

It is an object of the invention to provide a natural biological organic waste conversion system which is suitable for installation at remote locations and produces an effective decomposition of waste by evaporation and dehydration.

A further object of the invention is to provide a natural biological organic waste conversion system of such capacity as to accommodate public restroom facilities and wherein the system requires very little attention and maintenance, and is capable of effectively operating for long periods of time without attention.

An additional object of the invention is to provide a natural biological organic waste conversion system for the decomposition of solid human waste and the evaporation and dehydration of liquid waste wherein the waste is exposed to effective amounts of air and oxygen to accomplish the desired oxidation and decomposition and wherein the amount of oxygen that passes through the apparatus may be accurately regulated in accordance with usage.

A further object of the invention is to provide a biological organic waste conversion system utilizing a tank and a conversion bin located within the tank wherein the tank includes a material drying location wherein decomposed matter may be dried prior to removal from the conversion tank.

In the practice of the invention, a decomposing tank is formed of non-corrodible synthetic material. The apparatus disclosed is suitable for use with restroom facilities such as those located in park and recreational areas, and the decomposing tank is preferably located within the basement of a restroom building wherein the waste material is deposited into the tank by gravity.

The material treatment tank is defined by top, lateral side, and end panels, and also includes a bottom. The panels and bottom define a chamber within the tank, and within the tank chamber a waste receiving and conversion bin is defined by lateral baffles and a bulkhead. The lateral baffles are each located adjacent a tank lateral side panel and each includes upper and lower edges. The baffles are spaced from the tank lateral sides, or the configuration of the tank sides and baffle are such that air passages exist between the baffle and the associated tank side. Preferably, the tank includes an air vent in the front panel adjacent the top panel and the tank front panel, at its lower region also includes a removable clean-out access which is normally closed.

A ventilation duct is located at the lower region of the bin spaced above the tank bottom and is open on its underside and lateral regions to receive air which has been circulated in the tank and through the waste material being treated. At one end, the duct is vented to the atmosphere through a vertically extending chimney, and if desired, a powered ventilator may be mounted upon the chimney conduit to augment air circulation.

Air entering the upper regions of the bin entering through the toilet conduits, or the tank air inlet, will be exposed to the top surface of the waste, and will flow over the baffles' upper edges and under the baffles' lower edges through the waste in the bin lower region, and into the duct. Such extensive exposure of the waste to flowing air (oxygen) accelerates the dehydration and biological decomposition of the solid waste within the bin.

Liquid waste is deposited within the tank at a predetermined location so as to fall upon the tank bottom at a location remote from a drain. A serpentine liquid flow path is defined upon the tank bottom between the point where the liquid waste is deposited upon the bottom and the bottom drain wherein liquid flowing along the tank bottom must traverse a long flow path while being exposed to the flow of air through the bin. This exposure to air facilitates evaporation of the liquid waste, and under normal conditions the liquid waste is entirely disposed of by evaporation.

An area of the tank bottom adjacent the clean-out access is separated from the serpentine liquid flow path so as to remain dry, and processed decomposed material may be removed through the ventilation duct into this tank bottom dry area to complete drying of the processed material prior to removal from the tank chamber.

BRIEF DESCRIPTION OF THE DRAWINGS

The aforementioned objects and advantages of the invention will be appreciated from the following description and accompanying drawings wherein:

FIG. 1 is a perspective view of a biological waste conversion tank in accord with the inventive concepts, FIG. 2 is an enlarged perspective view of the waste conversion tank, the exterior top, side and end panels being shown in dotted lines as to illustrate the interior components shown in full lines, FIG. 5 is a plan sectional view of the waste conversion tank as taken along Section 5—5 of FIG. 3, FIG. 6 is a plan view illustrating the tank bottom as taken along Section 6—6 of FIG. 3, and FIG. 7 is an enlarged detail elevational view of tank bottom ribs as taken along Section 7—7 of FIG. 6.

DESCRIPTION OF THE PREFERRED EMBODIMENT

Figure 3:
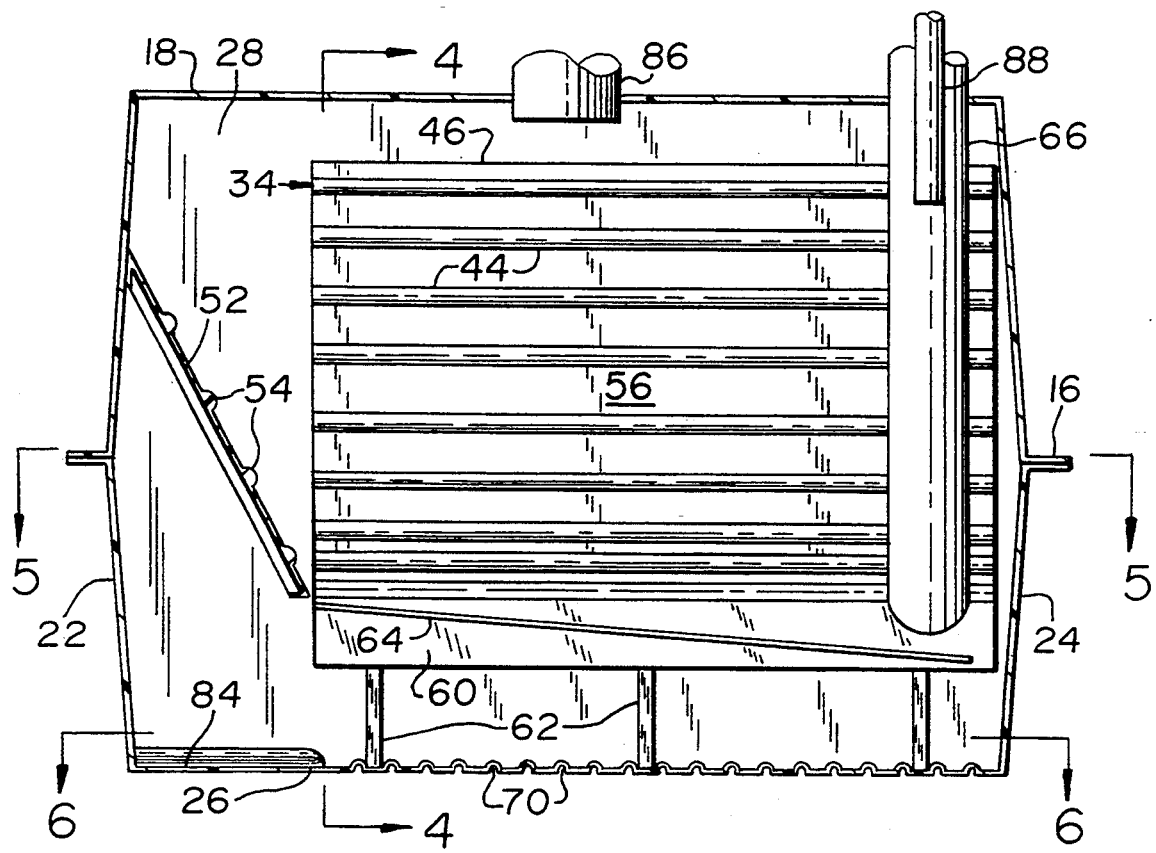
FIG. 3 is an elevational sectional view taken through the conversion tank lengthwise along Section 3—3 of FIG. 5.

A biological organic waste conversion system in accord with the invention comprises a tank 10 which, in the drawings, consists of an upper portion 12 and a lower portion 14. Preferably, the portions 12 and 14 are of generally similar configuration and dimension, and the sides thereof are tapered so that for shipping purposes the portions 12 and 14 may be stacked one inside the other. Each of the portions 12 and 14 include a flange 16 whereby the portions may be bolted or cemented together to define an integral unit.

The tank 10 includes the top panel 18, spaced lateral side panels 20, a front panel 22, a rear panel 24 and a bottom 26. It will be appreciated that the side and front and rear panels are defined by the configuration of the portions 12 and 14.

The panels 18, 20, 22 and 24, along with bottom 26, define the tank chamber 28. An air vent 30 is defined in the upper region of the front panel 22 adjacent the top panel 18, and a clean-out access 32 is formed in the lower region of the front panel 22 and is normally closed by an access door panel.

Within the chamber 28 a pair of lateral side baffles 34 are located, a baffle being mounted adjacent the inside of each tank side panel 20. The baffles 34 which include an upper region 36 and a lower region 38 and an inside surface 40. The upper regions 36 are substantially vertically oriented and parallel to each other, and are attached to the adjacent tank side panel 20 by spacers 42, FIGS. 4 and 5. The baffle lower regions 38 are obliquely oriented to the vertical such that the baffle lower edges extend toward each other as apparent in FIG. 4. Upon the inside surfaces 40 each of the baffles 34 includes a plurality of longitudinally extending ribs or projections 44, and the baffle upper edges 46 may be provided with a plurality of openings or notches 48 to permit air to enter between a baffle and its adjacent tank side panel. Rather than notches 48 being defined in the flanges of the baffles, it is also possible to form vertical recesses or ribs in the tank side panels 20 in order to provide a vertical air flow passage between the baffles and the tank sides.

The baffles 34 each include a lower edge 50 defining the lowermost portion of the lower regions 38 and the minimum distance between the baffles, and the edges 50 extend relatively close to the tank bottom 26.

An obliquely oriented bulkhead 52 is transversely located within the tank chamber 28 adjacent the front panel 22, as will be appreciated from FIGS. 2 and 3. The upper edge of the bulkhead 52 may engage the front panel 22 below the air vent 30, and the lower region of the bulkhead 52 is disposed adjacent the left end, FIG. 3, of the baffles 34 adjacent the intersection of the upper region 36 and lower region 38. The bulkhead 52 includes a plurality of longitudinally extending reinforcing ribs or projections 54.

Preferably, the components of the tank 10, the side baffles 34 and the bulkhead 52 are formed of a non-corrodible synthetic plastic material of relatively high tensile and flexural strength, such as an isphthalic polyester resin glass fiber. Such a material is highly resistant to corrosion, and the metal hardware components of the conversion tank system are preferably formed of stainless steel.

The side baffles 34, the tank rear panel 24, and the bulkhead 52 define a bin 56 within the tank chamber 28 for receiving the waste material, as later described. At its lower region, the bin 56 is defined by that portion of the tank bottom 26 below and between the side baffles 34, and a ventilation duct 58 is located within the bin 56 and extends the length thereof as will be appreciated from FIG. 5. The ventilation duct 58 consists of an inverted V barrier 60 centrally located between the side baffles 34 and is supported above the tank bottom 26 by a plurality of brackets 62 wherein the duct 58 will be closed at its upper region by the barrier 60, but will be open along its sides intermediate the brackets 62. The barrier 60 may be formed by a glass fiber element, and ribs 64 are defined on opposite sides of the barrier 60 which are inclined toward the tank rear panel 24, FIG. 3, to cause liquid engaging the barrier 60 to flow toward the tank rear panel. The ends of the duct 58 are open, and as will be appreciated from FIGS. 2 and 3, the left end of the duct 58 is located below the bulkhead 52 and is horizontally spaced from the tank front panel 22, and is in alignment with the clean-out access 32.

A chimney conduit 66 extends through the barrier 60 adjacent the tank rear panel 24 for communication with the duct 58. The chimney conduit 66 extends upwardly through the tank 10, and top panel 18, and may include an electric fan 68, FIG. 1, at its uppermost end. The fan 68 may be powered by a conventional electric motor if standard AC electric power is available, and in those remote locations where conventional electric power is not available a solar powered fan motor system may be employed if forced ventilation is desired.

Incidential waste liquid within the bin 56 will drain through the solid waste and engage the tank bottom 26. The preferable means for treating the liquid waste is to evaporate the same into the atmosphere through the chimney 66, and to this end the tank bottom 26 is provided with a plurality of homogeneous upstanding linear ribs 70 which are of a length less than the width of the tank bottom 26, as will be appreciated from FIG. 6. The ribs 70 are approximately three inches apart, and each extends approximately one-half inch above the general plane of the tank bottom 26. Alternate ends 72 of the ribs extend to the tank side panels, and the ends 74 terminate short of the adjacent side panel. The ribs 70 constitute small dams, and when the tank 10 is installed the portion of the bottom 26 adjacent rear panel 24 is elevated approximately one-half inch higher than the bottom portion adjacent front panel 22. Accordingly, liquid waste deposited upon the tank bottom at location 76, FIG. 6, must follow a long serpentine path around the ribs 70 and rib ends 74 as the liquid flows toward the left, FIG. 6. A liquid drain 78 is defined in the tank bottom 26 adjacent the front panel 22, and the drain 78 may be connected to suitable piping, not shown, connected to a dry well, storage tank, septic tank, or the like. Preferably, the size of the tank 10 is designed so that liquid will only flow through the drain 78 under unusual high usage conditions.

With reference to FIG. 6, the tank bottom ribs 80 and 82 extend a greater extent from the plane of the tank bottom 26 than do the ribs 70. For instance, the ribs 80 and 82 may extend one inch above the tank bottom to insure that liquid does not enter the tank bottom area 84 which is adjacent the front panel 22. As later described, the tank bottom area 84 is a dry area upon which decomposed material is temporarily located for drying purposes prior to being removed from the tank 10.

Human waste is deposited in the tank bin 56 through the waste conduit 86. The conduit 86 is connected to one or more toilets, not shown, wherein the waste will flow through the conduit 86 by gravity. The conduit 86 is substantially centrally located with respect to the dimensions of the bin 56, above the duct 58, and the bulkhead 52 will prevent the waste from entering that portion of the tank chamber 28 below the bulkhead and adjacent the front panel 22.

Liquid waste from the urinals, not shown, enters the tank 10 through the pipe 88 which extends through the top panel 18 adjacent the rear panel 24, as will be appreciated from FIGS. 1 and 3. The liquid waste pipe extends into the bin 56, and is located above the liquid location 76, FIG. 6, so that the liquid waste will be deposited upon the tank bottom 26 remotely from the drain 78 and the liquid is required to flow a maximum distance to reach the drain 78.

The size of the tank 10 to be utilized at a given location will be determined by a number of factors, such as the average temperature and humidity, the amount of seasonal and year round use, how often the system can be serviced, its elevation, whether or not heated air can be introduced into the tank, and whether or not a fan blower on the chimney conduit will be employed. In those situations where the average temperature is high, usage is minimal, and the conditions for decomposition are favorable, a smaller tank 10 can be employed and natural chimney venting without requiring a blower will be suitable. Higher usage, or other adverse decomposition conditions, will require a larger tank 10, and in very high usage operations a plurality of tanks and systems may be used.

Preferably, the tank 10 is located within the basement of a restroom facility, not shown, so as to permit gravitational movement of the waste to the tank. The toilet and urinal connections, not shown, will be located above the tank 10, and the chimney conduit 66 will extend upwardly through the restroom building to the atmosphere.

Figure 4:
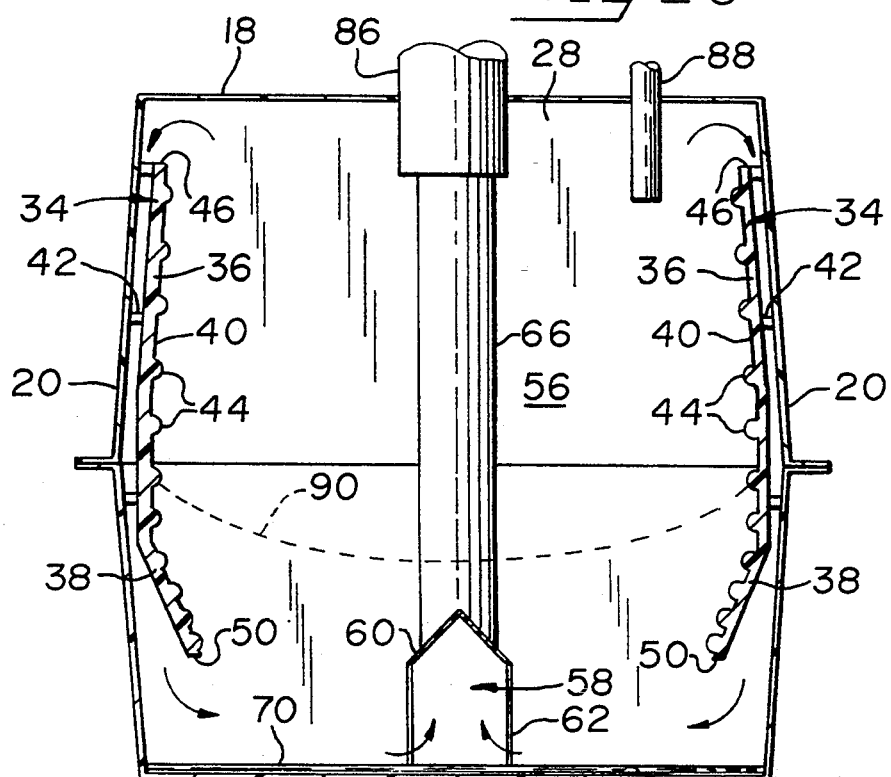
FIG. 4 is an elevational sectional transverse view of the waste conversion tank as taken along Section 4—4 of FIG. 3.

Initially, when the biological waste conversion system of the invention is started up, a starter material is placed within the bin 56 to the level 90 as indicated by the dotted line in FIG. 4. Such starter material may be coarse wood chips, peat moss, or other carbonaceous material, and a sufficient amount of starter material is placed within the bin 56 to seal off the bottom of the bulkhead 52 to insure the proper air flow through the tank chamber.

The upward flow of air through the chimney conduit 66, whether due to convection or forced fan movement, will draw air into the tank chamber 28 through the air vent 30, and through the waste conduit 86, which are normally open. Possibly, the air vent 30 will not be required if sufficient air can enter the chamber 28 through the conduit 86.

As air flows upwardly through the chimney conduit 66 a vacuum is formed within the chamber 28 causing air to enter the chamber 28 and bin 56 through the air vent 30 and the waste conduit 86. This air entering the chamber 28 adjacent the top panel 18 will expose the upper surface of the waste material within the bin 56 to oxygen and initiate the natural aerobic biological decomposition of the waste within the bin. Air within the bin also will pass over the side baffle upper edges 46, and under the side baffles' lower edges 50 as indicated by the arrows in FIG. 4. Air passing under the lower edges 50 will also pass through the waste material supported by tank bottom 26 and simultaneously evaporate the liquid upon the tank bottom located within the serpentine liquid flow path defined by the bottom ribs 70. The air flow into the duct 58 as indicated by the arrows, and the use of the side baffles 34 and the duct 58, insures an effective and efficient distribution of air and oxygen over and through the waste material to produce decomposition.

The presence of the projections 46 on the side baffles 34, the inward inclination of the side baffle lower regions 38, and the projections 54 on the bulkhead 52 tend to support the weight of the waste material by increasing the frictional contact between the waste material and the side baffles and bulkhead, and of course, these projections also reinforce the strength of the bulkhead and side baffles. Accordingly, the use of the side baffles and the bulkhead aids in maintaining the waste material density so as to permit air flow therethrough.

As the end of the duct 58 adjacent the clean-out access 32 is open, decomposed material can be pulled through the duct 58 onto the tank bottom area 84 and is permitted to stay on the area 84 for sufficient time to permit the material to dry, and at such time the processed material may be removed from the tank 10.

If the air being drawn into the tank 10 is from a heated location in the restroom building, the air flowing between the side baffles 34 and tank side panels 20 will insulate the tank 10 and maintain the tank at an elevated temperature which accelerates waste decomposition.

It is appreciated that various modifications to the inventive concepts may be apparent to those skilled in the art without departing from the spirit and scope of the invention.

I claim:

1. A biological organic waste conversion system comprising, in combination:
   a) a tank having a chamber defined by lateral side panels, front and rear panels, a top panel and a bottom,
   b) a waste inlet defined in said top panel in communication with said tank chamber having an outlet located between said tank lateral sides,
   c) an air inlet in communication with said tank chamber adjacent said top panel,
   d) a pair of lateral waste confining baffles located within said tank chamber, each baffle being disposed adjacent to a tank side panel and defining an air passage therewith, each baffle having an upper edge spaced from said top panel and an open lower edge spaced from the tank bottom whereby chamber air may flow over a baffle upper edge, between a baffle and the adjacent tank side panel and exit below the baffle lower edge, and e) an elongated ventilation duct located within said tank chamber intermediate said side panels and lateral baffles adjacent said tank bottom and having a duct inlet along its length in communication with air flowing under said baffles' lower edges and an outlet exhaust vent defined in said ventilation duct in communication with the atmosphere eterior of said tank chamber, whereby solid waste discharged into said tank chamber accumulates between said baffles and above said ventilation duct and is exposed to air entering said tank chamber through said air inlet passing over said baffles's upper edges and under said baffles' lower edges and through said ventilation duct inlet.

2. In a biological waste conversion system as in claim 1, said baffles each including an inner surface disposed toward the interior of said tank chamber, protuberances defined on said baffles' inner surfaces to strengthen said baffles and increase frictional contact between said baffles' inner surfaces and the waste within said chamber engaging said baffles.

3. In a biological waste conversion system as in claim 2, said protuberances comprising elongated substantially horizontal convex ribs.

4. In a biological waste conversion system as in claim 2, said baffles each including an upper region and a lower region, said baffles' lower edges being defined on said lower regions, said lower regions being obliquely inclined to the vertical and toward each other whereby said baffles' lower edges define the minimum spacing between said baffles.

5. In a biological waste conversion system as in claim 1, a liquid waste conduit having an outlet in communication with said tank chamber depositing liquid waste at a predetermined location on said tank bottom, a liquid drain defined in said tank bottom remotely located from said predetermined location, and a serpentine liquid flow path defined on said tank bottom between said predetermined location and said liquid drain whereby liquid waste deposited on said tank bottom follows an elongated evaporative path prior to reaching said liquid drain exposed to air passing under said baffles' lower edges and into said duct air inlet.

6. In a biological waste conversion system as in claim 5, a plurality of upwardly extending ridges defined on said tank bottom defining said serpentine liquid flow path.

7. In a biological waste conversion system as in claim 1, a normally closed operable clean-out access defined in said housing front panel in axial alignment with said ventilation duct.

8. A biological organic waste conversion system comprising, in combination:

a) a tank having a chamber defined by lateral side panels, front and rear panels, a top panel and a bottom, b) a baffle attached to each lateral side panel within said chamber each having an upper edge spaced from said top panel and an open bottom edge spaced from said tank bottom, said baffles defining an air passage between said baffles and adjacent side panel, c) a bulkhead defined in said tank chamber adjacent to and spaced from said front panel and extending between said baffles, said baffles and bulkhead defining a waste receiving and conversion bin within said chamber, d) a waste conduit defined in said top panel having an outlet located above said bin, e) an elongated ventilation duct located within said tank adjacent said bottom and extending through said bin, said ventilation duct including an air inlet throughout its length in communication with said bin, an exhaust vent defined in said ventilation duct in communication with the atmosphere exterior of said tank chamber, and f) an air inlet defined in at least one of said panels in communication with said bin adjacent said top panel whereby air may flow into said bin, over said baffles' upper edges, between said baffles and adjacent side panels and under said baffles' lower edges into said ventilation duct air inlet and through waste material within said bin.

9. In a biological waste conversion system as in claim 8, said baffles each including an inner surface disposed toward the interior of said tank chamber, protuberances defined on said baffles' inner surfaces to strengthen said baffles and increase frictional contact between said baffles' inner surfaces and the waste within said chamber engaging said baffles.

10. In a biological waste conversion system as in claim 9, said protuberances comprising elongated substantially horizontal convex ribs.

11. In a biological waste conversion system as in claim 10, said baffles each including an upper region and a lower region, said baffles' lower edges being defined on said lower regions, said lower regions being obliquely inclined to the vertical and toward each other whereby said baffles' lower edges define the minimum spacing between said baffles.

12. In a biological waste conversion system as in claim 8, a liquid waste conduit having an outlet in communication with said tank chamber depositing liquid waste at a predetermined location on said tank bottom, a liquid drain defined in said tank bottom remotely located from said predetermined location and a serpentine liquid flow path defined on said tank bottom between said predetermined location and said liquid drain whereby liquid waste deposited on said tank bottom follows an elongated evaporative path prior to reaching said liquid drain exposed to air passing under said baffles' lower edges and said duct air inlet.

13. In a biological waste conversion system as in claim 12, a plurality of upwardly extending ridges defined on said tank bottom defining said serpentine liquid flow path.

14. In a biological waste conversion system as in claim 12, a normally closed clean-out access defined in said tank front panel in alignment with said ventilation duct, said duct being open adjacent said clean-out access, a processed waste receiving area defined on said tank bottom below said bulkhead exterior of said bin, and adjacent said access, and liquid barrier means defined on said tank bottom about said area to maintain said processed waste receiving area dry.

15. In a biological waste conversion system as in claim 8, said ventilation duct comprising an elongated barrier having a top surface disposed toward said tank top panel and an open lower region defining said duct air inlet, said duct including first and second ends, and support brackets supporting said barrier in spaced relation above said tank bottom.

16. In a biological waste conversion system as in claim 15, a normally closed clean-out access defined in said tank front panel in alignment with said barrier first end, said barrier first end being open whereby said ventilation duct may be used to remove processed waste from said bin.

17. In a biological waste conversion system as in claim 16, said duct barrier first end being located below said bulkhead and exterior of said bin, said vent being in communication with said barrier second end.

* * * * *